US012320177B2

(12) United States Patent
Krailo

(10) Patent No.: US 12,320,177 B2
(45) Date of Patent: Jun. 3, 2025

(54) TENSION HINGE PIN FOR DOOR HINGES

(71) Applicant: Terry R. Krailo, Houston, TX (US)

(72) Inventor: Terry R. Krailo, Houston, TX (US)

( * ) Notice: Subject to any disclaimer, the term of this patent is extended or adjusted under 35 U.S.C. 154(b) by 34 days.

(21) Appl. No.: 18/327,297

(22) Filed: Jun. 1, 2023

(65) Prior Publication Data

US 2024/0035325 A1 Feb. 1, 2024

Related U.S. Application Data

(60) Provisional application No. 63/347,782, filed on Jun. 1, 2022.

(51) Int. Cl.
*E05D 11/08* (2006.01)
*E05D 5/12* (2006.01)
*E05D 5/10* (2006.01)

(52) U.S. Cl.
CPC .......... *E05D 5/12* (2013.01); *E05D 2005/108* (2013.01)

(58) Field of Classification Search
CPC ................. G06F 1/1681; G06F 1/1616; E05Y 2900/606; E05Y 2201/26; H04M 1/0216; E05D 11/08; E05D 11/081; E05D 11/082; E05D 11/084; E05D 11/085; E05D 3/02; E05D 5/14; E05D 2005/145; E05D 2005/108; E05D 5/12; F16C 11/04
See application file for complete search history.

(56) References Cited

U.S. PATENT DOCUMENTS

| | | | | | |
|---|---|---|---|---|---|
| 544,071 | A * | 8/1895 | Philbrook | E05D 11/082 | 16/341 |
| 6,574,836 | B1 * | 6/2003 | Steeber | E05D 11/082 | 16/337 |
| 7,703,577 | B1 * | 4/2010 | Zach | E05D 11/02 | 184/104.1 |
| 7,891,055 | B1 * | 2/2011 | Combs | E05D 11/084 | 16/386 |
| 2003/0046792 | A1 * | 3/2003 | Thorn | E05D 11/105 | 16/342 |
| 2005/0273978 | A1 * | 12/2005 | Norman | E05D 11/082 | 16/342 |
| 2006/0225248 | A1 * | 10/2006 | Ishiwata | E05D 11/082 | 16/330 |
| 2009/0165248 | A1 * | 7/2009 | Wang | E05D 11/082 | 16/339 |
| 2010/0125974 | A1 * | 5/2010 | Tang | G06F 1/1616 | 16/307 |

(Continued)

FOREIGN PATENT DOCUMENTS

| | | | | |
|---|---|---|---|---|
| CN | 202468688 U * | 10/2012 | G06F 1/1681 |
| DE | 202009015948 U1 * | 4/2010 | E05D 11/082 |

(Continued)

*Primary Examiner* — Chuck Y Mah
(74) *Attorney, Agent, or Firm* — Michael S. McCoy; Amatong McCoy LLC

(57) ABSTRACT

Tension hinge pins are disclosed. The tension hinge pins include a body with a hollow interior, an opening into the hollow interior, and an expandable body positioned within the hollow interior. The tension hinge pins include an actuator positioned to engage the expandable body and actuate expansion of expandable body to expand at least a portion of the expandable body outward through the opening. The tension hinge pins can be installed in a hinge used for hanging doors.

18 Claims, 10 Drawing Sheets

(56) References Cited

U.S. PATENT DOCUMENTS

| | | | | |
|---|---|---|---|---|
| 2010/0146734 | A1* | 6/2010 | Munson | E05D 5/121 16/337 |
| 2013/0119842 | A1* | 5/2013 | Tzeng | H04N 1/00554 16/285 |

FOREIGN PATENT DOCUMENTS

| | | | | | |
|---|---|---|---|---|---|
| EP | 0051022 | B1 | * | 4/1985 | |
| EP | 1030020 | A1 | * | 8/2000 | E05D 5/127 |
| EP | 1174576 | A1 | * | 1/2002 | E05D 11/082 |
| JP | 2007146518 | A | * | 6/2007 | |
| JP | 2016211662 | A | * | 12/2016 | |

* cited by examiner

TENSION HINGE PIN FOR DOOR HINGES

CROSS-REFERENCE TO RELATED APPLICATIONS

The present application claims the benefit of U.S. Provisional Patent Application No. 63/347,782, filed on Jun. 1, 2022, and entitled "Tension Hinge Pin for Door Hinges," the entirety of which is incorporated herein by reference.

FIELD

The present disclosure relates to tension hinge pins for use in door hinges; to door hinges and doors including the same; and to methods of making, assembling, and using the same.

BACKGROUND

Doors are typically coupled with a doorway frame via hinge plates and hinge pins. One problem often confronted is that a door may swing open or closed due to the improper installation, door frames shifting or settling over time, door warping, or environmental forces such as wind. For example, doors can swing freely as a result of been hung improperly, being hung over an unlevel floor foundation, or being hung on a leaning wall.

BRIEF SUMMARY

Some embodiments of the present disclosure include a tension hinge pin. The hinge pin includes a hinge pin body. At least a portion of the hinge pin body has a hollow interior. The hinge pin includes an opening through the hinge pin body into the hollow interior. An expandable body is positioned within the hollow interior. At least a portion of the expandable body is aligned with the opening. An actuator is positioned to engage the expandable body and actuate expansion of expandable body to expand at least a portion of the expandable body outward through the opening.

Some embodiments of the present disclosure include a hinge. The hinge includes a first leaf having first knuckle, a second leaf having second knuckle, and a hinge pin engaged through the first and second knuckles; thereby, coupling the first and second leaves. The hinge pin includes a hinge pin body. At least a portion of the hinge pin body has a hollow interior. The hinge pin includes an opening through the hinge pin body into the hollow interior. The opening is aligned with both the first and second knuckles. An expandable body is positioned within the hollow interior. At least a portion of the expandable body is aligned with the opening. An actuator is positioned to engage the expandable body. The actuator is positioned to actuate expansion of the expandable body to expand at least a portion of the expandable body outward through the opening to frictionally engage with both the first and second knuckles.

Some embodiments of the present disclosure include a door installation. The door installation includes a doorway frame, a door, and a hinge coupled with the doorway frame and the door such that the door is hung on the doorway frame. The hinge includes a first leaf having first knuckle, a second leaf having second knuckle, and a hinge pin engaged through the first and second knuckles; thereby, coupling the first and second leaves. The hinge pin includes a hinge pin body. At least a portion of the hinge pin body has a hollow interior. The hinge pin includes an opening through the hinge pin body into the hollow interior. The opening is aligned with both the first and second knuckles. An expandable body is positioned within the hollow interior. At least a portion of the expandable body is aligned with the opening. An actuator is positioned to engage the expandable body. The actuator is positioned to actuate expansion of the expandable body to expand at least a portion of the expandable body outward through the opening to frictionally engage with both the first and second knuckles.

Some embodiments of the present disclosure include a method of regulating movement of a door. The method includes providing a door installation that includes a doorway frame, a door, and a hinge coupled with the doorway frame and the door such that the door is hung on the doorway frame. The hinge includes a first leaf having first knuckle, a second leaf having second knuckle, and a hinge pin engaged through the first and second knuckles; thereby, coupling the first and second leaves. The method includes actuating frictional engagement between the hinge pin and the first and second knuckles.

BRIEF DESCRIPTION OF THE DRAWINGS

So that the manner in which the features and advantages of the systems, apparatus, and/or methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

DETAILED DESCRIPTION

Certain embodiments of the present disclosure include tension hinge pins for use in door hinges. The tension hinge pins can be installed in one or more hinges used to hang a door onto a doorway frame. The tension hinge pins can provide for control over whether a door swings open or closed. In some embodiments, the tension hinge pins disclosed herein can provide for control of a rate at which a door swings open or closed. Embodiments of the present disclosure include hinges including the tension hinge pins, and doors having such hinges. Other embodiments of the present disclosure includes methods of making, assembling, and installing the tension hinge pins, hinges including such tension hinge pins, and doors including such hinges. Some embodiments of the present disclosure include a method of regulating the movement of a door relative to a doorway frame using the tension hinge pins.

Each of FIGS. 1-16B of U.S. Provisional Patent Application No. 63/347,782 (the '782 application) are incorporated herein by reference in their entireties, including the descriptions thereof.

Tension Hinge Pin

Figure 1:
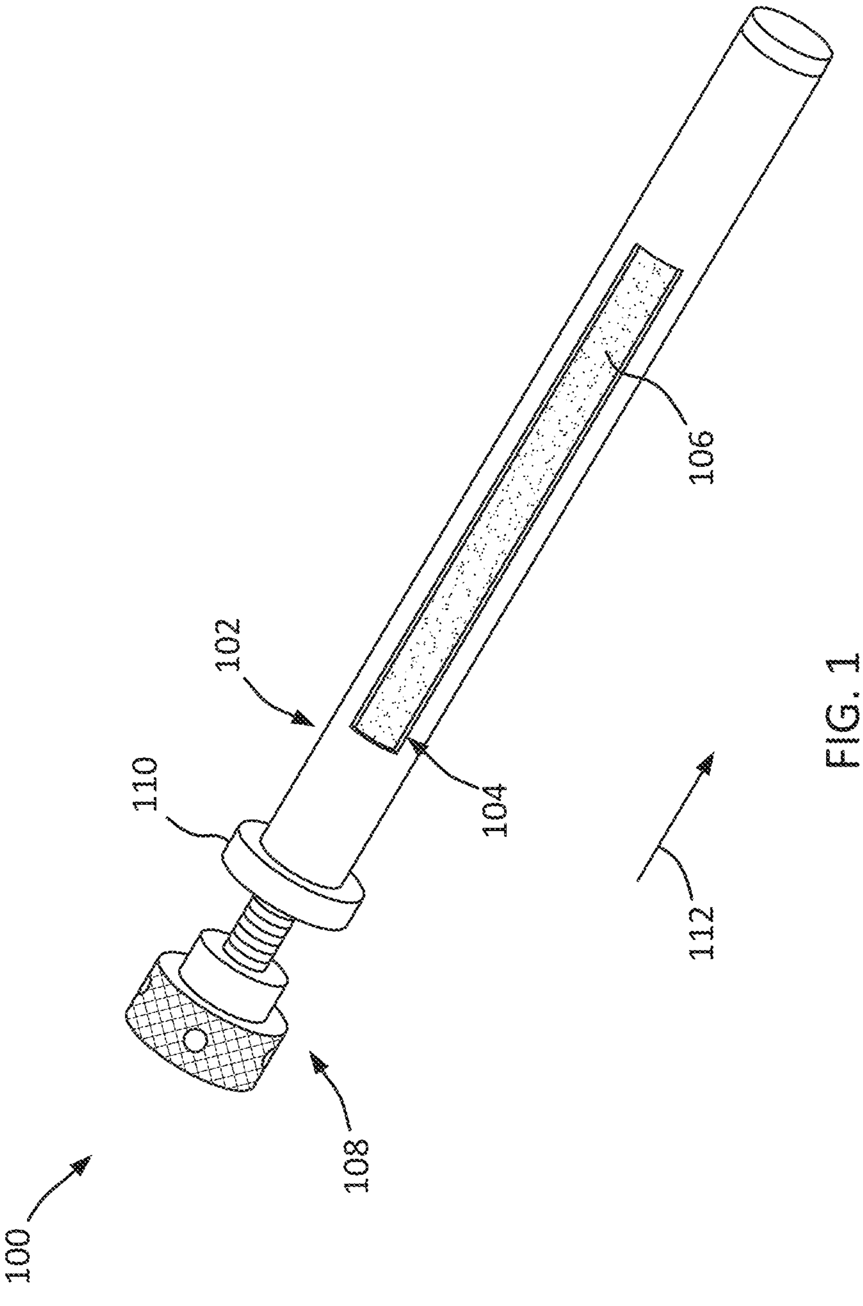
FIG. 1 depicts an embodiment of a tension hinge pin.

FIG. 1 depicts one exemplary tension hinge pin in accordance with embodiments of the present disclosure. Tension hinge pin 100 includes pin body 102. Pin body 102 has an expansion opening 104 therein. Expansion opening 104 is an opening (e.g., slit or window) into an interior hollow of pin body 102. While only one expansion opening is shown, the tension hinge pins disclosed herein can have multiple expansion openings. Tension hinge pin 100 includes expandable body 106 (e.g., a rubber insert) positioned within the hollow of pin body 102. Tension hinge pin 100 includes actuator 108. Actuator 108 is configured to actuate expansion of expandable body 106. In the depicted embodiment, actuator 108 is a compression screw that is threadably coupled with pin body 102 at pin head 110. However, the actuators disclosed herein are not limited to being screws, and may be or include other structures capable of actuating the expansion of the expandable bodies disclosed herein.

The expandable body 106 is depicted in a contracted state such that expandable body 106 is not expanded through and out of expansion opening 104. Actuation of the expansion of expandable body 106 includes rotating actuator 108 to threadably engage actuator 108 further into pin body boy 102 in direction 112. The movement of actuator 108 further into pin body 102 exerts a pressure on expandable body 106. At a sufficient pressure, expandable body 106 is compressed and expands out, through expansion opening 104.

The tension hinge pins disclosed herein can be configured to be the same or substantially the same size as standard hinge pins such that the tension hinge pins can be inserted into existing door hinges. For example, the tension hinge pins can be shaped and sized to accommodate standard door hinges that are 3/16"×3.5", 3/16"×4", 1/4"×3.5", or 1/4"×4". The expandable bodies of the tension hinge pins can be made of various materials, such as synthetic polymers, aluminum, steel, or brass. One exemplary material of the expandable bodies is rubber (natural or synthetic). The structure and function of the actuator may vary depending on the material of the expandable body and the manner in which the expandable body is compressed and expanded.

Figure 2:
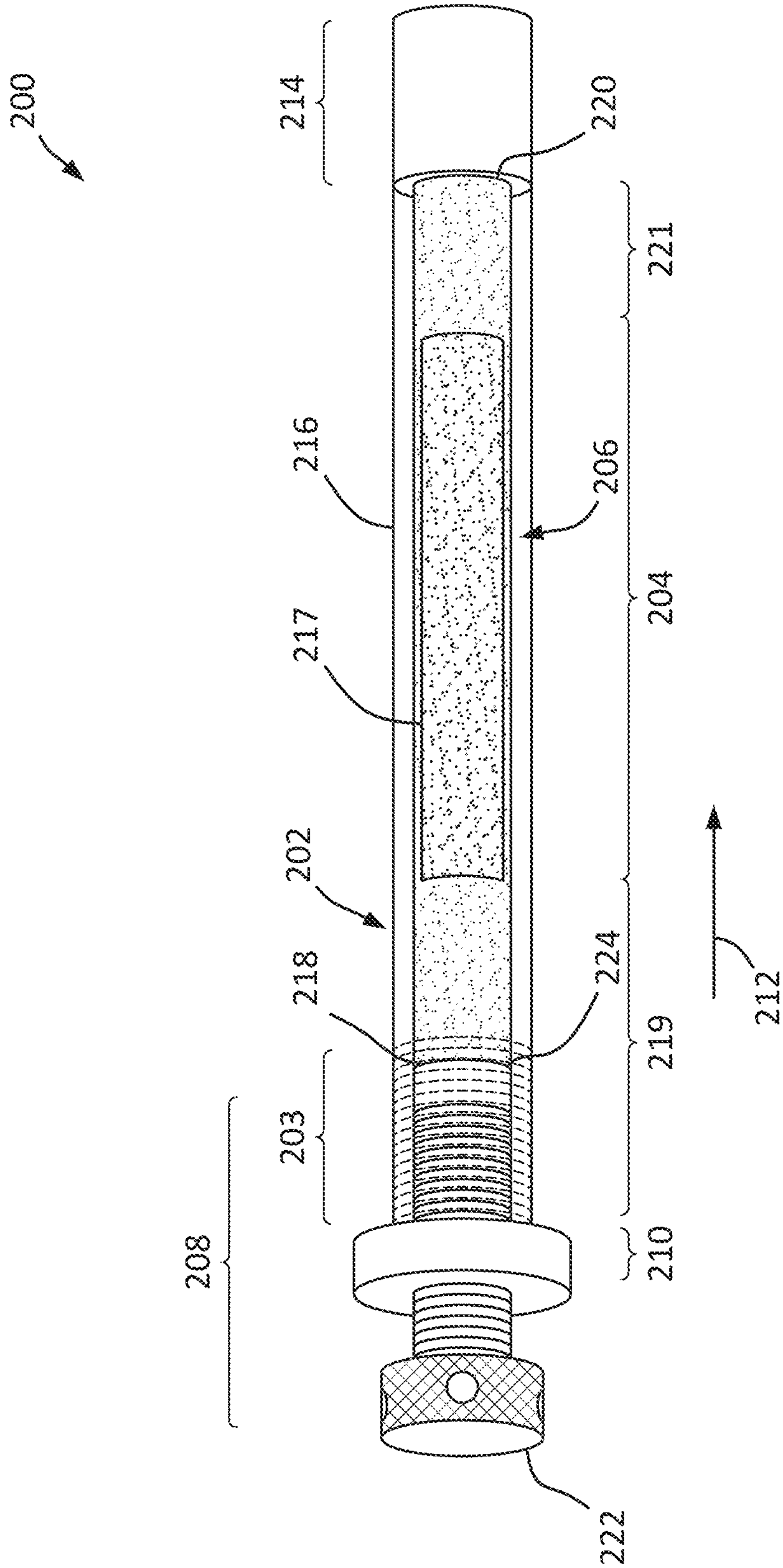
FIG. 2 depicts an embodiment of a tension hinge pin showing interior portions of the tension hinge pin.

FIG. 2 depicts another exemplary tension hinge pin in accordance with embodiments of the present disclosure. Exemplary dimensions of tension hinge pin 200 are shown in FIG. 2; however, the tension hinge pins disclosed herein are not limited to being of the particular dimensions shown in the Figures, and may be sized and shaped to couple with various hinges for various applications. Tension hinge pin 200 includes pin body 202. For clarity, the internal portions of pin body 202 are shown. Pin body 202 includes solid pin base 214 and hollow pin body 216. Positioned within hollow pin body 216 is expandable body 206. Expandable body 206, here shown as a rubber insert, has a first end 218 and a second end 220. Second end 220 is engaged with solid pin base 214. First end 218 is engaged with actuator 208. While the pin body in FIG. 2 is shown as including a hollow portion and a solid portion, the pin bodies disclosed herein are not limited to this particular structure.

Actuator 208 is configured to actuate expansion of expandable body 206. Actuator 208 is a compression screw that is threadably coupled with interior threads 203 of pin body 202 at pin head 210. In the embodiment of FIG. 2, first end 222 of actuator 208 includes a knurled screw head, and second end 224 of actuator 208 is engaged within the hollow of pin body 202 and with first end 218 of expandable body 206.

Actuation of the expansion of expandable body 206 includes rotating actuator 208 to threadably engage actuator 208 further into pin body boy 202 in direction 212. Increasing movement of actuator 208 into pin body 202 causes second end 224 of actuator 208 to exert increasing pressure on expandable body 206 by engagement with first end 218 of expandable body 206. Expandable body 206 is prevented from moving in direction 212 by solid pin base 214, such that the increasing pressure, when sufficient, causes expandable body 206 to expand outward, through expansion opening 204 in hollow pin body 216. As shown, a central portion 217 of expandable body 206 expands outward through expansion opening 204 while the first and second ends 218 and 220 of the expandable body 206 remain within the hollow pin body 216 within the interior gaps 219 and 221. To contract the expandable body 206, the actuator 208 can be rotated opposite direction 212.

Figure 3:
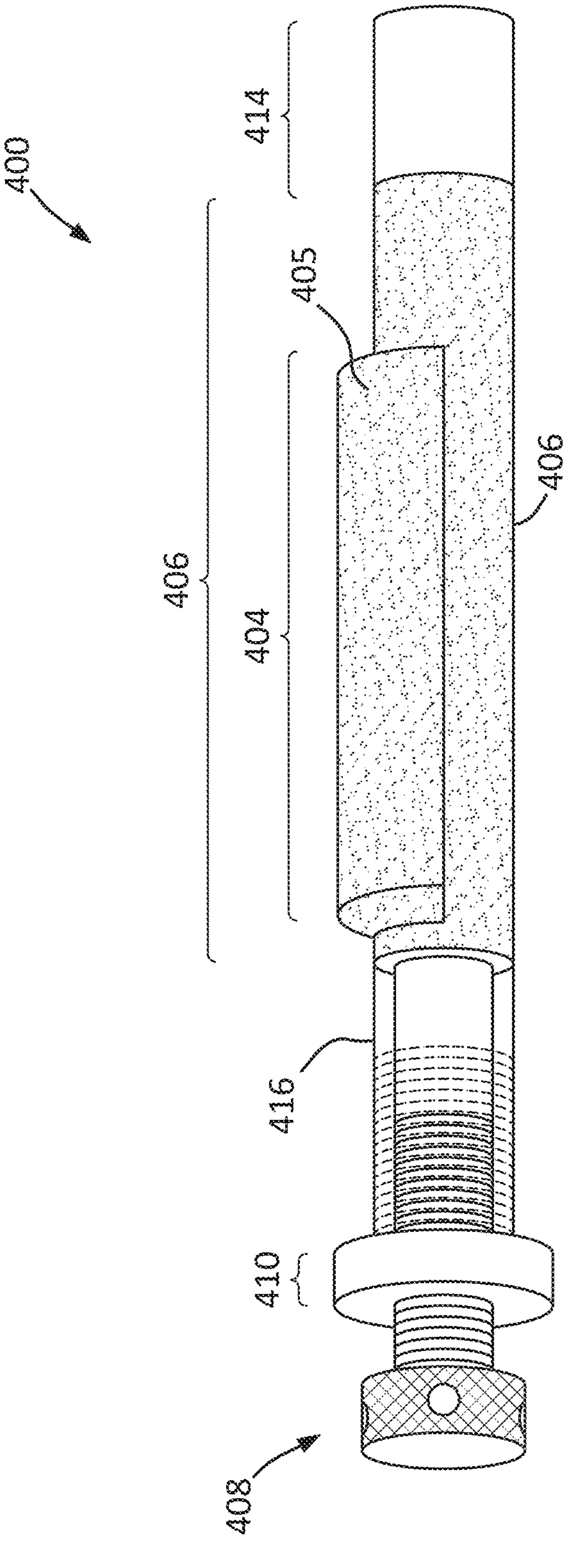
FIG. 3 depicts an embodiment of a tension hinge pin showing an expandable body in an expanded state.

FIG. 3 depicts another exemplary tension hinge pin in accordance with embodiments of the present disclosure. The tension hinge pin 400 shown in FIG. 3 is substantially similar to that shown in FIG. 1, with the exception of the dimension of the overall tension hinge pin, the dimensions of the components thereof, and that the expandable body in FIG. 3 is at least partially expanded outward from the expansion opening.

As shown, actuator 408 is threadably engaged, at pin head 410, within the hollow pin body 416 to a degree that is sufficient to cause the expandable body 406 to expand outward through the expansion opening 404. In particular, central portion 405 of the expandable body 406, between the actuator 408 and the base 414, is projected outward from the hollow pin body 416 through the expansion opening 404. The expandable body 406 extrudes through the slotted expansion opening 404. Once the expandable body 406 extrudes through the expansion opening 404, the expandable body 406 creates tension by causing friction between two hinge halves (two hinge leaves) and, thereby, restricts an attached door from swinging freely on the hinge. More resistance to movement of the door can be created by further tightening the actuator 408 (e.g., compression screw) to cause greater expansion of the expandable body 406 more tension on the hinge.

Figure 4:
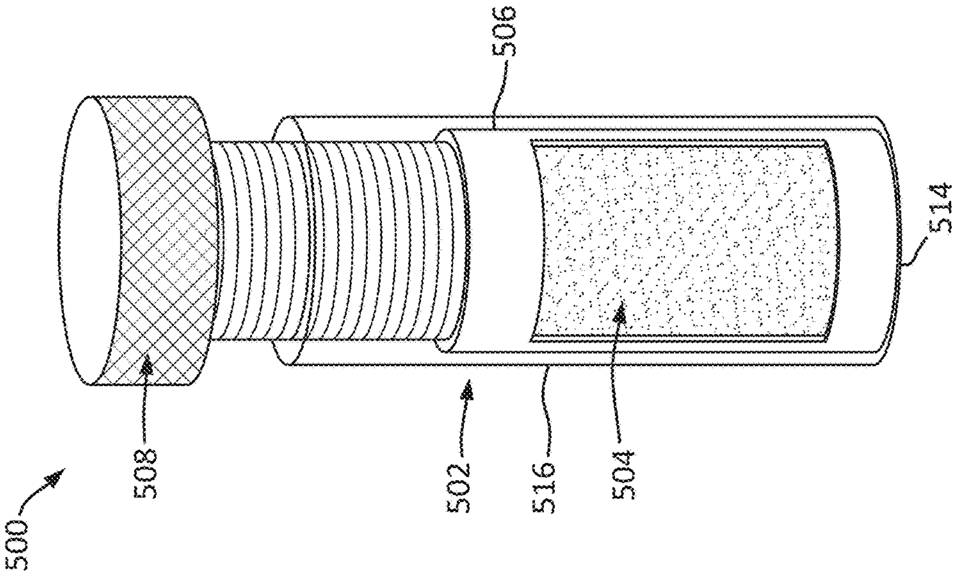
FIG. 4 depicts an embodiment of a tension hinge pin showing interior portions of the tension hinge pin.

FIG. 4 depicts another exemplary tension hinge pin in accordance with embodiments of the present disclosure. Tension hinge pin 500 is substantially similar to those shown in FIGS. 2 and 3. Tension hinge pin 500 includes pin body 502, solid pin base 514, hollow pin body 516, expandable body 506, actuator 508 (here shown as a thumb screw), and expansion opening 504.

Figure 5A:
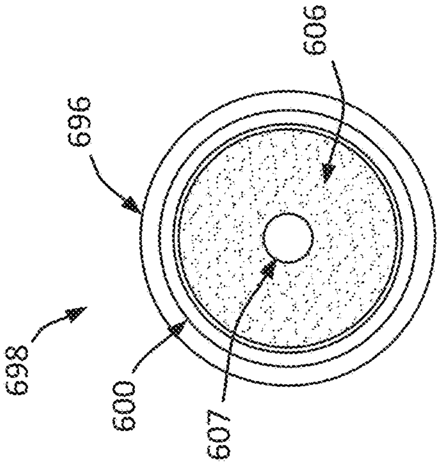
FIG. 5A depicts an embodiment of a tension hinge pin engaged within a knuckle of a door hinge with the expandable body in a contracted state.
Figure 5B:
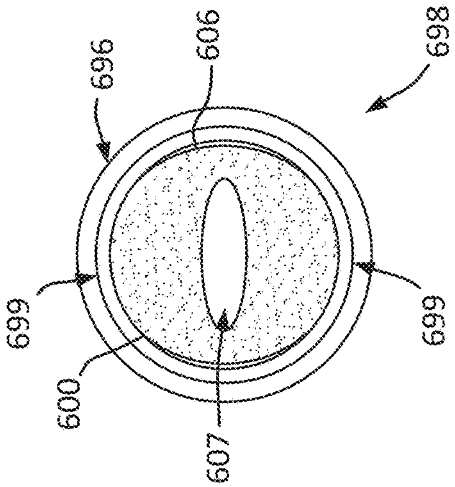
FIG. 5B depicts an embodiment of a tension hinge pin engaged within a knuckle of a door hinge with the expandable body in an expanded state.

FIGS. 5A and 5B depict cross-sectional views of a tension hinge pin the same as or similar to FIG. 4, above the opening 504, and as installed within a knuckle of a hinge. In FIGS.

5A and 5B, the expandable body is in a contracted state and an expanded state, respectively. For simplicity and clarity, only one knuckle of the hinge is depicted in FIGS. 5A and 5B; however, the hinges disclosed herein can include other components of a hinge such as additional knuckles and leaves.

Figure 6:
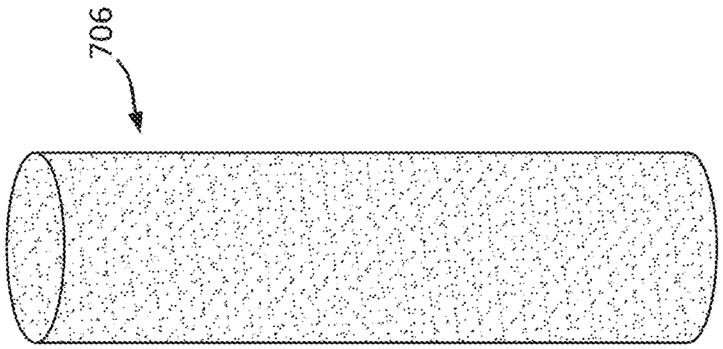
FIG. 6 depicts an expandable body.

Hinge 698 includes knuckle 696. Tension hinge pin 600 is engaged within knuckle 696. Tension hinge pin 600 includes expandable body 606. The expandable body 606 has an expansion gap 607 therein. The expansion gap 607 provides for and/or enhances the ability of the expandable body 606 to expand in one or more directions. As shown in FIG. 6B, the shape of expansion gap 607 is responsive to expansion of the expandable body 606. When the expandable body 606 is expanded, portions of the expandable body 606 extend from the expansion opening of the pin 600 and engage with the knuckle 696 such that friction 699 is exhibited between the expandable body 606 and the knuckle 696. FIG. 6 depicts an embodiment of the expandable body 706 in isolation from a remainder of the tension hinge pin.

Figure 7:
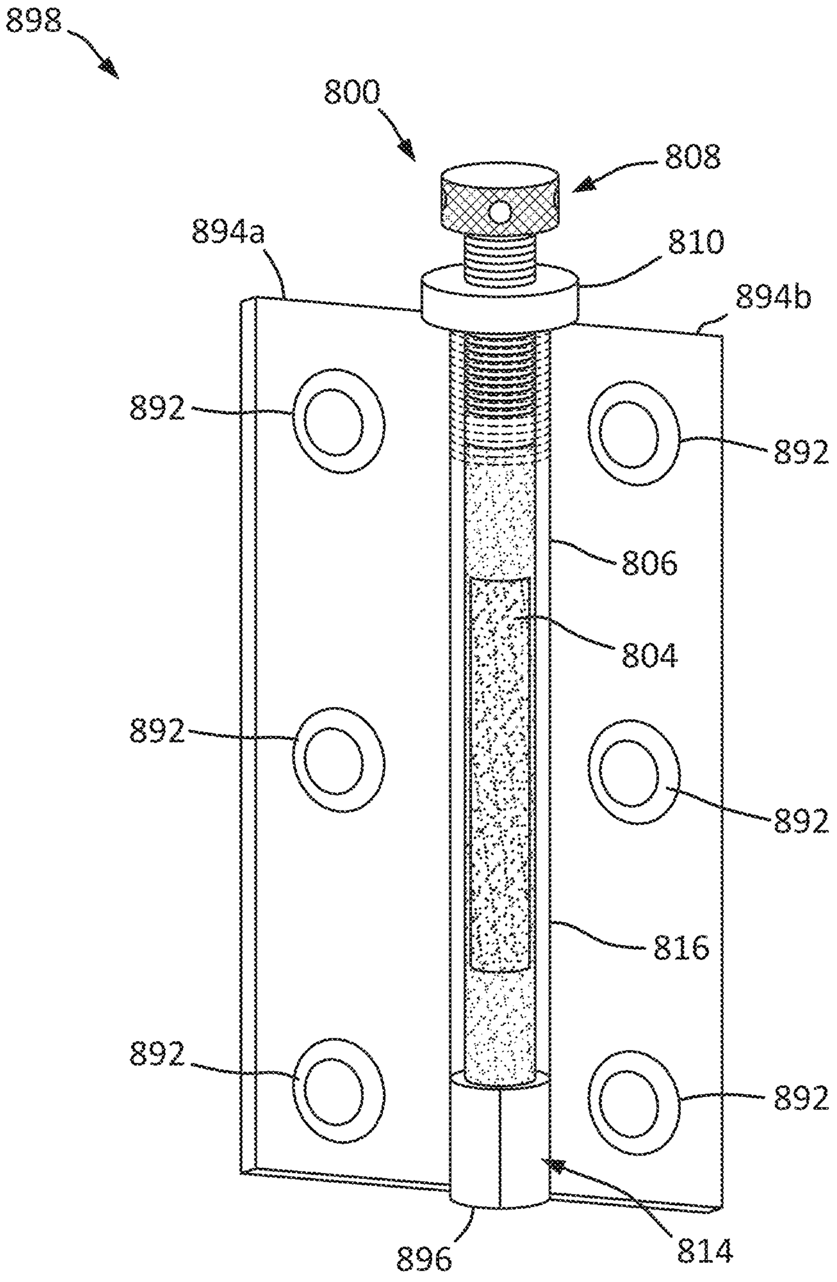
FIG. 7 depicts a hinge with an embodiment of the tension hinge pin installed therein.

FIG. 7 depicts a hinge in accordance with embodiments of the present disclosure. Hinge 898 includes leaf 894*a* and leaf 894*b* with knuckles 896, and tension hinge pin 800. Leaves 894*a* and 894*b* may be configured to attached with a door and a doorway frame to hang the door. For example, leaf 894*a* includes screw holes 892 for attachment one of a door and a doorway frame, and leaf 894*b* includes screw holes 892 for attachment the other of the door and the doorway frame. To assemble the hinge 898, the knuckles 896 of leaf 894*a* are aligned with the knuckles 896 of the leaf 894*b*. With the knuckles 896 of the leaves 894*a* and 894*b* aligned, the tension hinge pin 800 is inserted through each of the knuckles 896; thereby, coupling the leaf 894*a* with the leaf 894*b*. Tension hinge pin 800 may be installed until pin head 810 is engaged with one of the knuckles 896.

The tension hinge pin 800 can be installed such that the expansion opening 804 is aligned with at least one knuckle 896 of each of the leaves 894*a* and 894*b*. Expandable body 806 is shown positioned within hollow pin body 816, between actuator 808 and solid pin base 814. Expansion of the expandable member 806 through expansion window 804 results in frictional engagement between the expandable member 806 and at least one knuckle 896 of each of the leaves 894*a* and 894*b*.

Applications and Use

In some applications, the tension hinge pins disclosed herein can be used to resist door swinging (e.g., if the door is off-balance). For example, the tension hinge pins disclosed herein can be used to reduce or eliminate free swinging of a door that is otherwise improperly hung, a door that is hung above an unlevel floor foundation, or a door that is hung on a leaning wall. Some exemplary operations and applications of the tension hinge pin are described below with reference to FIG. 7.

In operation, when the hinge 898 is coupled with a door and a doorway frame, the actuator 808 can be used to selectively expand or contract the expandable body 806 to provide a desired tension to the hinge 898. The tension provided to the hinge 898, through the frictional force exhibited between the expandable body 806 and the knuckles 896, can be sufficient to allow a user to open and close the door, while also being sufficient to maintain or substantially maintain the door in the position where the user places the door; thereby, reducing or eliminating swinging of the door from the position. For example, if a user desires the door to be fully open, the user can open the door to the fully open position and then release the door once the door is fully open. With the door fully open, the frictional force exhibited between the expandable body 806 and the knuckles 896 can be of sufficient degree to maintain the door in the fully open position. Thus, the tension hinge pins can be adjusted to a tension that is sufficient to maintain or substantially maintain the position of the door, but that is not sufficient to prevent the user from being capable of opening and closing the door.

In some embodiments, the expandable body disclosed herein can be selectively expanded and contracted. For example, a user may desire the expandable body to be in a contracted state (i.e., not expanded) at certain times for ease of movement of the door, and then in an expanded state at other times to maintain or substantially maintain a position of the door. For example, if it is desired to maintain a door in a first open position (either fully open or partially open), the door can be opened to the first open position, and then, with the door in the first open position, the actuator 808 can be used to actuate the expansion of the expandable body 806. With the expandable body 806 expanded, the frictional forces exhibited between the expandable body 806 and the knuckles 896 maintain or substantially maintain the door in the first open position. The door can be move door to a second position, if desired. If the friction between the expandable body 806 and the knuckles 896 is sufficient to prevent movement of the door by a user, then the actuator 808 can be used to contract the expandable body 806 to reduce or eliminate the frictional forces exhibited between the expandable body 806 and the knuckles 896. The door can then be closed, or moved to the second open position where the actuator 808 can again be used to actuate the expansion of the expandable body 806 to maintain or substantially maintain the door in the second open position.

The tension hinge pin can be used to maintain a door in a closed position. For example, with a door in the closed position, the actuator 808 can be used to actuate the expansion of the expandable body 806. The expandable body 806 can be expanded to a degree that is sufficient to create frictional forces between the expandable body 806 and the knuckles 896 that maintains or substantially maintains the door in the closed position even if a user attempts to open the door. Thus, the tension hinge pin can function, to at least some degree, as a lock on the door.

The tension hinge pin can operate to regulate a speed at which a door opens and/or closes. For example, the actuator 808 can be used to actuate the expansion of the expandable body 806 to a degree sufficient to provide frictional forces between the expandable body 806 and the knuckles 896 that slows, but does not prevent, the movement of the door during opening and closing of the door.

Thus, the tension hinge pin disclosed herein can be selectively used as a door stopper, a door damper, and/or a door lock.

While the tension hinge pins disclosed herein are described in relating to hanging doors, the tension hinge pins may be used in other applications where hinge pins are used.

Figure 8:
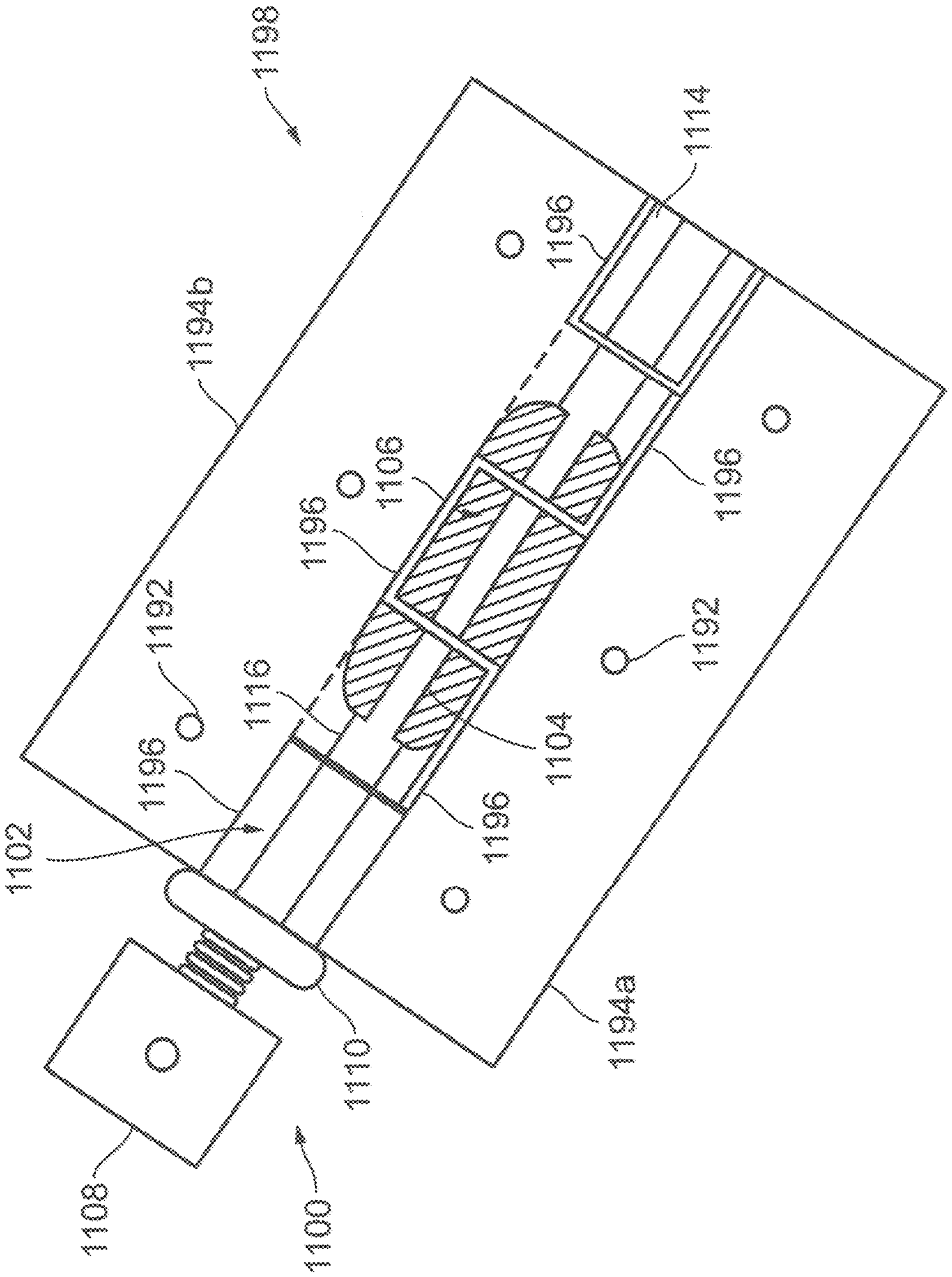
FIG. 8 depicts a hinge with an embodiment of the tension hinge pin installed therein.

FIG. 8 depicts a hinge with an exemplary tension hinge pin in accordance with embodiments of the present disclosure. The hinge 1198 includes tension hinge pin 1100. Tension hinge pin 1100 includes pin body 1102, solid pin base 1114, hollow pin body 1116, expandable body 1106, actuator 1108, pin head 1110, and expansion opening 1104. Tension hinge pin 1100 is inserted through the knuckles 1196 of each leaf 1194*a* and 1194*b* of hinge 1198. The expandable body 1106 is shown in an at least partially expanded state such that friction is exhibited between the expandable body 1106 and the knuckles 1196. The leaves 1194_a_ and 1194_b_ can be attached with a door and a doorway frame to hang the door via screw holes 1192.

Figure 9B:
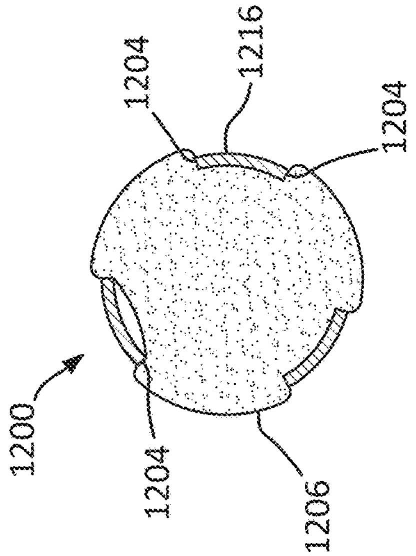
FIG. 9B is a top view of the tension hinge pin of FIG. 9A.
Figure 9C:
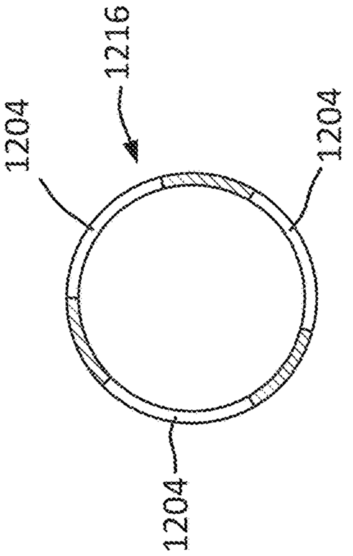
FIG. 9C depicts a hinge pin body of the tension hinge pin of FIG. 9B without the expandable body therein.
Figure 9A:
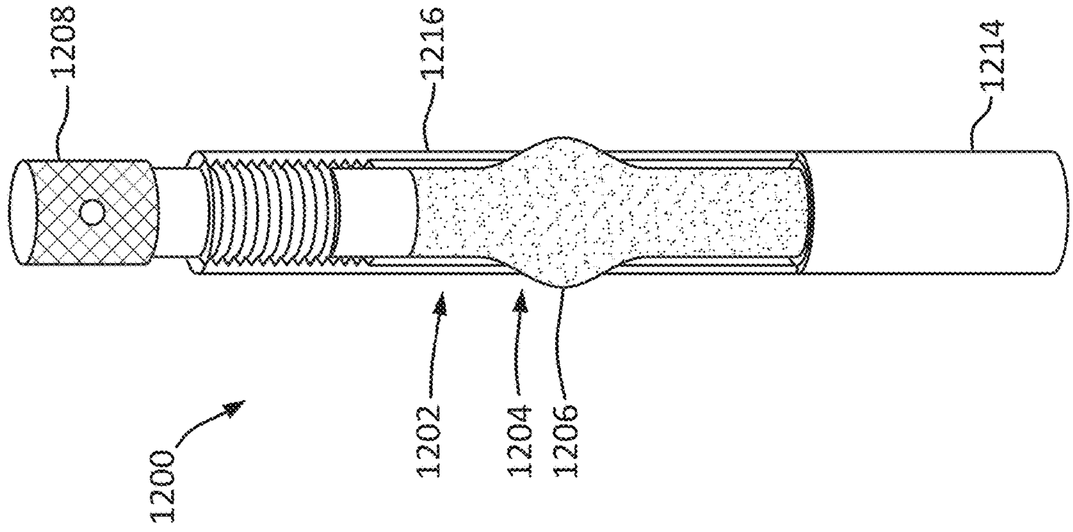
FIG. 9A is a side view of a tension hinge pin with the expandable body in an expanded state.

FIGS. 9A-9C depict another exemplary tension hinge pin and components thereof in accordance with embodiments of the present disclosure. Tension hinge pin 1200 includes pin body 1202, solid pin base 1214, hollow pin body 1216, expandable body 1206, actuator 1208, and expansion opening 1204. As shown in FIGS. 9A and 9B, the expandable body 1206 is in an expanded state such that a portion of the expandable body 1206 forced outward through the expansion openings 1204 in the hollow pin body 1216 to engage with the knuckles (not shown) of a hinge (not shown). FIG. 9C depicts the hollow pin body 1216 in isolation from the expandable body 1206.

Figure 10:
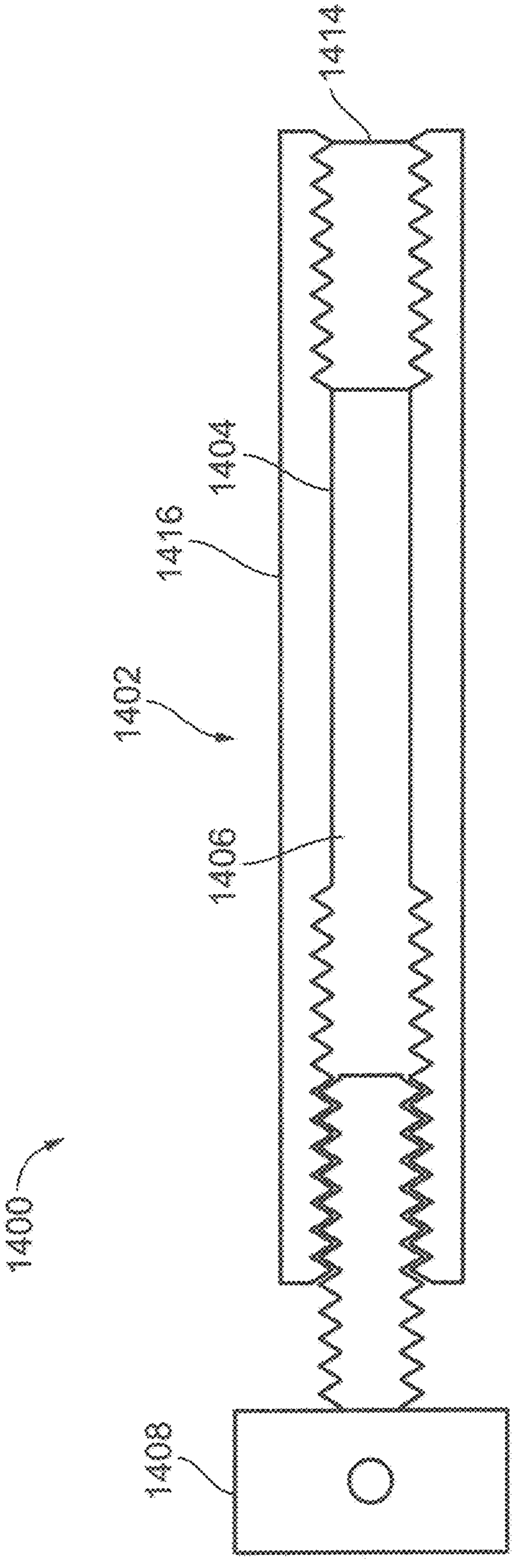
FIG. 10 depicts an embodiment of a tension hinge pin showing interior portions of the tension hinge pin.

FIG. 10 depicts another embodiment of the tension hinge pin in accordance with the present disclosure. Tension hinge pin 1400 includes pin body 1402, solid pin base 1414, hollow pin body 1416, expandable body 1406, actuator 1408, and expansion opening 1404. In the embodiment of FIG. 10, the solid pin base 1414 is a set screw that is engaged with threads at a base of the pin body 1402. The pin body 1402 can be a roll pin with internal threads for engagement with the solid pin base 1414 and the actuator 1408.

Figure 11A:
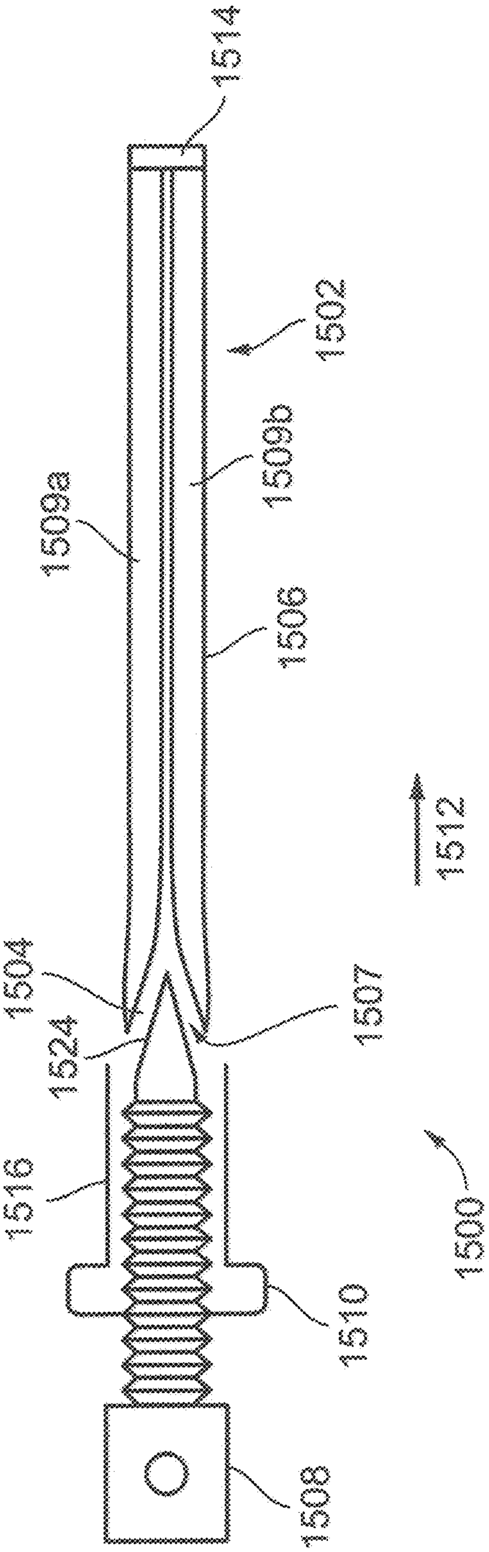
FIGS. 11A and 11B depict an embodiment of a tension hinge pin including an expandable split metal insert.
Figure 11B:
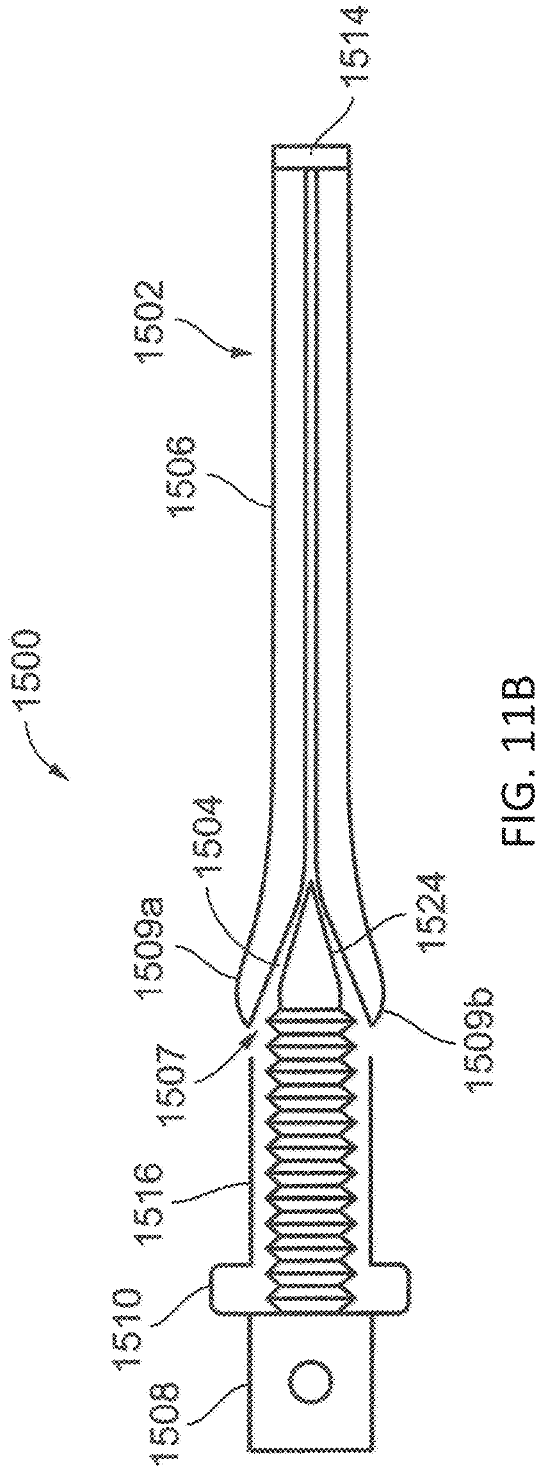

FIGS. 11A and 11B depict another embodiment of the tension hinge pin disclosed herein. In FIGS. 11A and 11B, the expandable body 1506 is in the form of an expandable split metal insert. Tension hinge pin 1500 includes pin body 1502, solid pin base 1514, hollow pin body 1516, actuator 1508, pin head 1510, and expansion opening 1504. In the embodiment of FIGS. 11A and 11B, the split metal insert of expandable body 1506 includes an opened end 1507 that is beveled. As the second end 1524 of the actuator 1508 is moved in direction 1512, the actuator 1508 at least partially enters the opened end 1507 and applies a pressure to each side 1509_a_ and 1509_b_ (wings) of the expandable body 1506, causing the sides 1509_a_ and 1509_b_ to spread outward. When the actuator 1508 is moved in the direction 1512 to a sufficient depth, the sides 1509_a_ and 1509_b_ will expand outward from the expansion opening 1504 to apply a pressure onto any adjacent hinge knuckles.

Figure 12:
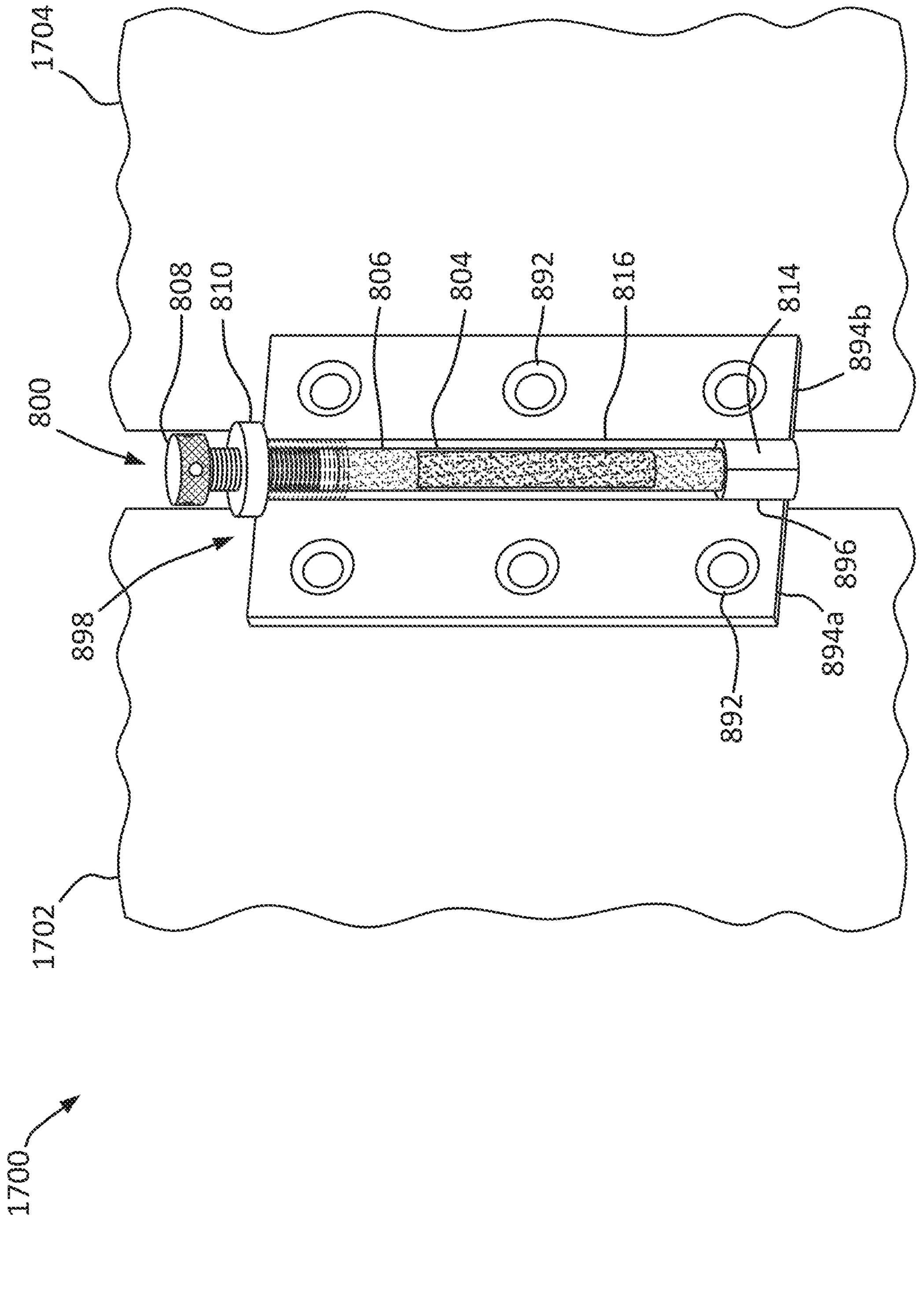
FIG. 12 depicts a door installation.

FIG. 12 depicts an exemplary door installation. Door installation 1700 includes hinge 898 that includes leaf 894_a_ and leaf 894_b_ with knuckles 896, and tension hinge pin 800. Leaves 894_a_ and 894_b_ are attached with a door 1702 and a doorway frame 1704, respectively, to hang the door 1702. Leaf 894_a_ and leaf 894_b_ each include screw holes 892 for attachment to door 1702 and doorway frame 1704. Tension hinge pin 800 is inserted through each of the knuckles 896; thereby, coupling the leaf 894_a_ with the leaf 894_b_.

Tension hinge pin 800 is installed until pin head 810 is engaged with one of the knuckles 896. The tension hinge pin 800 is installed such that the expansion opening 804 is aligned with at least one knuckle 896 of each of the leaves 894_a_ and 894_b_. Expandable body 806 is positioned within hollow pin body 816, between actuator 808 and solid pin base 814. Expansion of the expandable member 806 through expansion window 804 results in frictional engagement between the expandable member 806 and at least one knuckle 896 of each of the leaves 894_a_ and 894_b_.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A hinge pin, the hinge pin comprising:
- a hinge pin body, wherein at least a portion of the hinge pin body has a hollow interior;
- an opening through the hinge pin body into the hollow interior;
- an insert positioned within the hollow interior, wherein at least a portion of the inert is aligned with the opening;
- an actuator positioned to engage the inert and actuate the insert to project outward through the opening;
- wherein actuation of the insert forces the insert to spread outward through the opening.

2. The hinge pin of claim 1, wherein the actuator is a screw that is threadably coupled with pin body and extends into the hollow interior.

3. The hinge pin of claim 1, wherein the insert is an expandable body, wherein the actuator is configured to regulate a state of the expandable body between at least two states, the at least two states including an expanded wherein at least a portion of the expandable body extends outward through the opening and a contracted state wherein an entirety of the expandable body is positioned within the hollow interior.

4. The hinge pin of claim 3, wherein the hinge pin body comprises a base, and wherein the expandable body is positioned between the base and the actuator.

5. The hinge pin of claim 4, wherein, when expanded, the expandable body is at least partially compressed between the actuator and the base.

6. The hinge pin of claim 1, wherein the insert comprises a synthetic polymer, aluminum, steel, or brass.

7. The hinge pin of claim 1, wherein the insert comprises an elastomer.

8. The hinge pin of claim 1, wherein the insert comprises rubber.

9. The hinge pin of claim 1, wherein the insert is a rubber insert that is expandable via compression to project outward through the opening.

10. The hinge pin of claim 1, wherein the insert is a metal insert.

11. The hinge pin of claim 10, wherein actuation of the metal insert forces the at least a portion of the body outward to extend through the opening.

12. A hinge pin, the hinge pin comprising:
- a hinge pin body, wherein at least a portion of the hinge pin body has a hollow interior;
- an opening through the hinge pin body into the hollow interior;
- a body positioned within the hollow interior, wherein at least a portion of the body is aligned with the opening;
- an actuator positioned to engage the body and actuate the body to project outward through the opening;
- wherein the body is an expandable body, wherein the actuator is configured to regulate a state of the expandable body between at least two states, the at least two states including an expanded state wherein at least a portion of the expandable body extends outward through the opening and a contracted state wherein an entirety of the expandable body is positioned within the hollow interior; and wherein the expandable body has a cavity in an interior of the expandable body, wherein a shape of the cavity is responsive to expansion of the expandable body.

13. A hinge pin, the hinge pin comprising:

a hinge pin body, wherein at least a portion of the hinge pin body has a hollow interior;

an opening through the hinge pin body into the hollow interior;

a body positioned within the hollow interior, wherein at least a portion of the body is aligned with the opening;

an actuator positioned to engage the body and actuate the body to project outward through the opening;

wherein the insert comprises a split body including two wings coupled at a first end of the split body and an opening between the two wings at a second end of the split body, wherein the actuator is positioned to engage within the opening to cause the wings to expand outward through the opening to actuate expansion of body.

14. A hinge, the hinge comprising:

a first leaf having first knuckle;

a second leaf having second knuckle; and a hinge pin engaged through the first and second knuckle, thereby coupling the first and second leaves;

wherein the hinge pin comprises:

a hinge pin body, wherein at least a portion of the hinge pin body has a hollow interior;

an opening through the hinge pin body into the hollow interior, wherein the opening is aligned with both the first and second knuckles;

a body positioned within the hollow interior, wherein at least a portion of the body is aligned with the opening; and an actuator positioned to engage the body; and wherein the actuator is positioned to actuate the body to project outward through the opening to frictionally engage with both the first and second knuckles.

15. A door installation, the door installation comprising:

a doorway frame;

a door;

a hinge coupled with the doorway frame and the door such that the door is hung on the doorway frame, the hinge comprising a first leaf coupled with the door and having a first knuckle, a second leaf couple with the doorway frame and having second knuckle, and a hinge pin engaged through the first and second knuckles, thereby coupling the first and second leaves;

wherein the hinge pin comprises:

a hinge pin body, wherein at least a portion of the hinge pin body has a hollow interior;

an opening through the hinge pin body into the hollow interior, wherein the opening is aligned with both the first and second knuckles;

body positioned within the hollow interior, wherein at least a portion of the body is aligned with the opening; and an actuator positioned to engage the body; and wherein the actuator is positioned to actuate the body to project outward through the opening to frictionally engage with both the first and second knuckles.

16. The door installation of claim 15, wherein the actuator is positioned to actuate the body to project outward through the opening to frictionally engage with both the first and second knuckles sufficiently to eliminate free swinging of the door between open and closed positions.

17. The door installation of claim 15, wherein the actuator is positioned to actuate the body to project outward through the opening to frictionally engage with both the first and second knuckles sufficiently to maintain the door in an at least partially open position or to prevent opening of the door from a closed position.

18. The door installation of claim 15, wherein the actuator is positioned to actuate the body to project outward through the opening to frictionally engage with both the first and second knuckles sufficiently to allow, but dampen, movement of the door between open and closed positions.

* * * * *